United States Patent [19]

Landreth

[11] Patent Number: 4,664,703

[45] Date of Patent: May 12, 1987

[54] METHOD FOR SUPPRESSING FUMING IN MOLTEN STEEL

[75] Inventor: Ronald R. Landreth, Crown Point, Ind.

[73] Assignee: Inland Steel Company, Chicago, Ill.

[21] Appl. No.: 871,885

[22] Filed: Jun. 9, 1986

[51] Int. Cl.$^4$ ............................................. C22C 33/08
[52] U.S. Cl. ........................................... 75/96; 75/49
[58] Field of Search ................. 75/49, 130 R, 96, 129

[56] References Cited

U.S. PATENT DOCUMENTS

| | | | |
|---|---|---|---|
| 4,432,793 | 2/1984 | Hilaire | 75/130 R |
| 4,505,745 | 3/1985 | Hamada | 75/129 |
| 4,584,015 | 4/1986 | Hartwig | 75/49 |

*Primary Examiner*—Peter D. Rosenberg
*Attorney, Agent, or Firm*—Marshall, O'Toole, Gerstein, Murray & Bicknell

[57] ABSTRACT

Techniques for suppressing fumes from a bath of molten steel containing fume-generating, alloying ingredients comprising bismuth, lead, manganese and aluminum. The techniques employ natural gas to combust oxygen immediately above the bath, and certain controls are exercised to optimize fume suppression.

13 Claims, 5 Drawing Figures

METHOD FOR SUPPRESSING FUMING IN MOLTEN STEEL

BACKGROUND OF THE INVENTION

The present invention relates generally to methods for suppressing fuming in molten steel and more particularly to methods for suppressing fuming in molten steel containing fume-generating ingredients.

The fume-generating, alloying ingredients to which the present invention is directed comprise bismuth, lead, aluminum and manganese. These fume-generating ingredients are added to a bath of molten steel typically contained within a ladle, or in the case of strand cast steel, sometimes in the tundish of a continuous casting apparatus.

A bath of molten steel without any of these fume-generating ingredients emits fumes in the form of iron vapor which is oxidized by the oxygen in the atmosphere directly above the bath causing formation of iron oxides. The conversion of iron vapors to iron oxides depletes the iron vapors above the bath and causes further generation of iron fumes to replenish the iron fumes converted to iron oxides. In such a case, fuming is maintained by the presence of oxygen in the atmosphere directly above the bath and such fuming is called forced vaporization.

The prior art solution for dealing with iron fuming has been to remove or eliminate the oxygen immediately above the bath of molten steel. This has been accomplished by combusting the oxygen with natural gas introduced through a conventional lance to the locale directly above the molten steel bath where the oxygen is located. By removing the oxygen from above the molten steel bath in this manner, the generation of iron oxide fume has been drastically reduced.

In another technique, called passive control, the oxygen above the molten steel bath is consumed by reaction with iron vapor and the resulting oxygen-depleted atmosphere is contained or confined above the bath.

Prior art studies have indicated that, for pure metals, the fume generation rate is directly related to the partial pressure of oxygen and is independent of temperature and a particular metal's vapor pressure.

Fume-generating, alloying ingredients such as bismuth, lead, manganese and aluminum have vapor pressures substantially greater than that of iron. Based on the teachings of the prior art, one would conclude that the fume generation rate for these elements, when added as alloying ingredients to molten steel, should be the same as that for molten iron for a given partial pressure of oxygen. Accordingly, if the partial pressure of oxygen is reduced to a level at which fuming of iron from the molten steel is unobjectionable, fuming due to these alloying ingredients should also be unobjectionable. Such, however, has proved to be not the case.

SUMMARY OF THE INVENTION

Each of the fume-generating, alloying ingredients to which the present invention is directed has a vapor pressure substantially greater than that of iron. These alloying ingredients comprise bismuth, lead, manganese and aluminum.

In accordance with the present invention, it has been determined that the fuming rates for these alloying ingredients, when added to molten steel, are substantially greater than the fuming rate for molten iron, and the fuming rates in molten steel containing these alloying ingredients are objectionable even when the partial pressure of oxygen is at a level at which the fuming rate for the molten iron is unobjectionable. The fuming rate is at a highly objectionable level particularly during the time the alloying ingredient is added to the molten steel and for a few minutes thereafter.

In accordance with the present invention, it has been determined that the amount of fumes which is generated when the molten steel contains one of the fume-generating, alloying ingredients described above is dependent not only upon the partial pressure of the oxygen above the steel bath, but also it is dependent upon the partial pressure (vapor pressure) of the alloying ingredient itself and upon the activity of that alloying ingredient. Fume suppression techniques which may have sufficed to suppress an undesirable amount of fuming from molten steel not containing a given one of these fume-generating ingredients would not suffice when that ingredient is present in the molten steel. Instead, oxygen removal techniques must be employed to an extent greater than that required to control fuming when the molten steel does not contain that fume-generating ingredient.

In accordance with the present invention, when the molten steel contains a fume-generating ingredient having a vapor pressure greater than that of iron, the oxygen-reducing step should be initiated from the beginning of the time when the fume-generating ingredient is added. As was the case with prior art fume suppression techniques, the oxygen may be removed by combustion with natural gas. One embodiment of the present invention also comprises forming a blanket of inert gas immediately above the top surface of the bath, in addition to the step of removing the oxygen.

It has also been determined that, for a given bath of molten steel containing fume-generating, alloying ingredients, there is an optimum flow rate for the natural gas used to combust the oxygen, and this flow rate can be readily determined for a given system. Below this optimum flow rate, there is an increased amount of fuming, and above this optimum flow rate the natural gas undergoes cracking, which generates soot. The production of soot is undesirable as it reduces the overall level of fume suppression.

Other features and advantages are inherent in the method claimed and disclosed or will become apparent to those skilled in the art from the following detailed description in conjunction with the accompanying diagrammatic drawings.

DETAILED DESCRIPTION

The present invention will now be described in a context wherein bismuth is employed as an example of a fume-generating, alloying ingredient.

Bismuth has a vapor pressure 8,000 times greater than that of molten iron at 1600° C. The effect of fume suppression on a molten steel bath containing 0.15 and 0.30 wt. % bismuth is reflected in FIGS. 1-4. Other than Bi, the molten steel had an average composition as follows, in wt. %:

| | |
|---|---|
| C | 0.16 |
| Mn | 0.06 |
| P | 0.008 |
| S | 0.035 |
| Si | 0.13 |
| Fe | essentially the balance |

Bismuth additions were made by plunging bismuth pellets below the surface of a bath of said molten steel maintained at 1600° C. Natural gas was utilized to combust the oxygen above the bath. The natural gas may be introduced by means of a conventional lance vertically disposed above the center of the bath. If more than one lance is employed, they should be evenly spaced above the bath.

Figure 1:
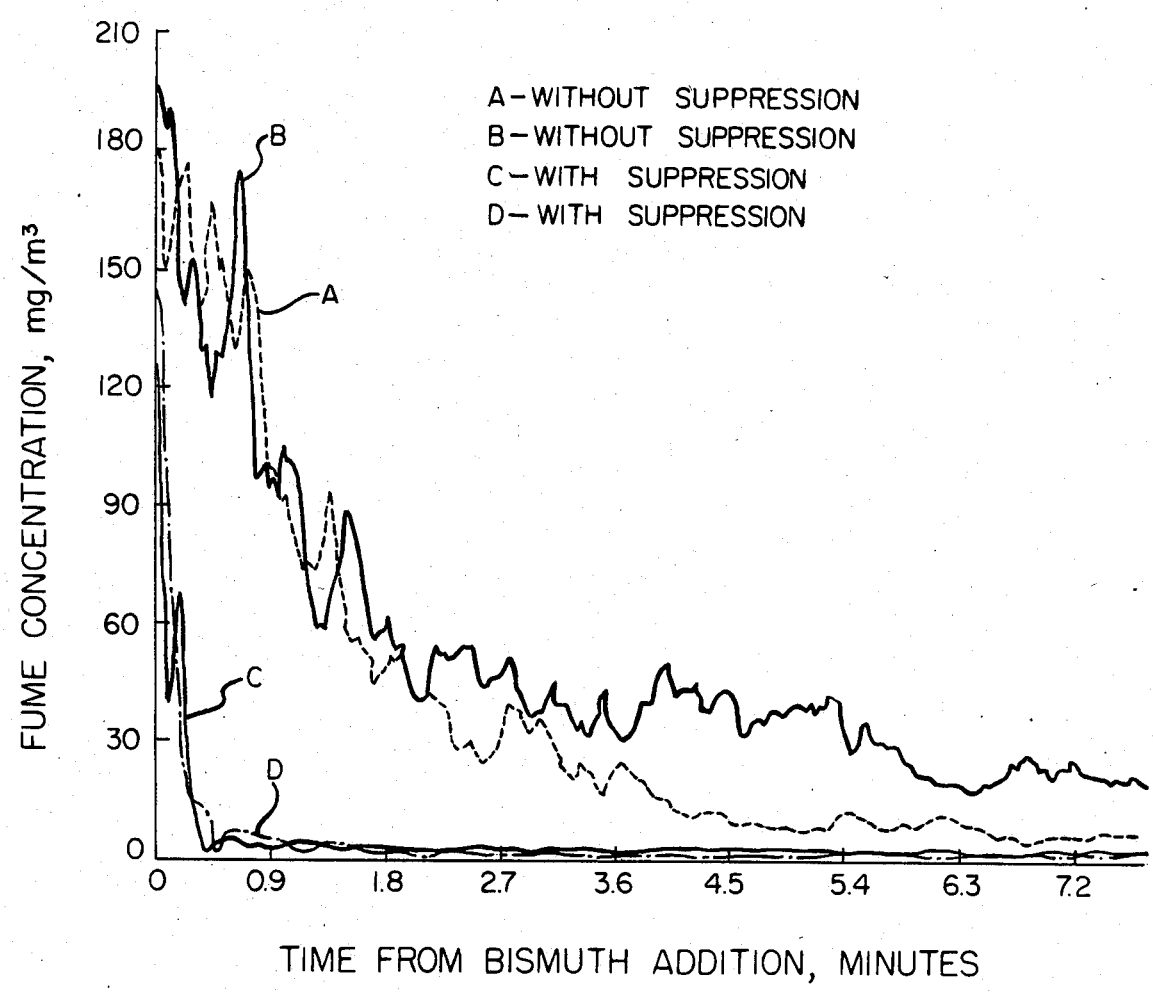
FIGS. 1-4 are graphs plotting fume concentration versus time, with and without fume suppression.

The amount of fume emission (fume concentration) is plotted against time, starting at the time of bismuth addition, in FIGS. 1–4. FIG. 1 reflects the data for four runs in which 0.15 wt. % bismuth was added. Two of these runs employed fume suppression using a natural gas flame, while the other two runs did not employ fume suppression.

Figure 2:
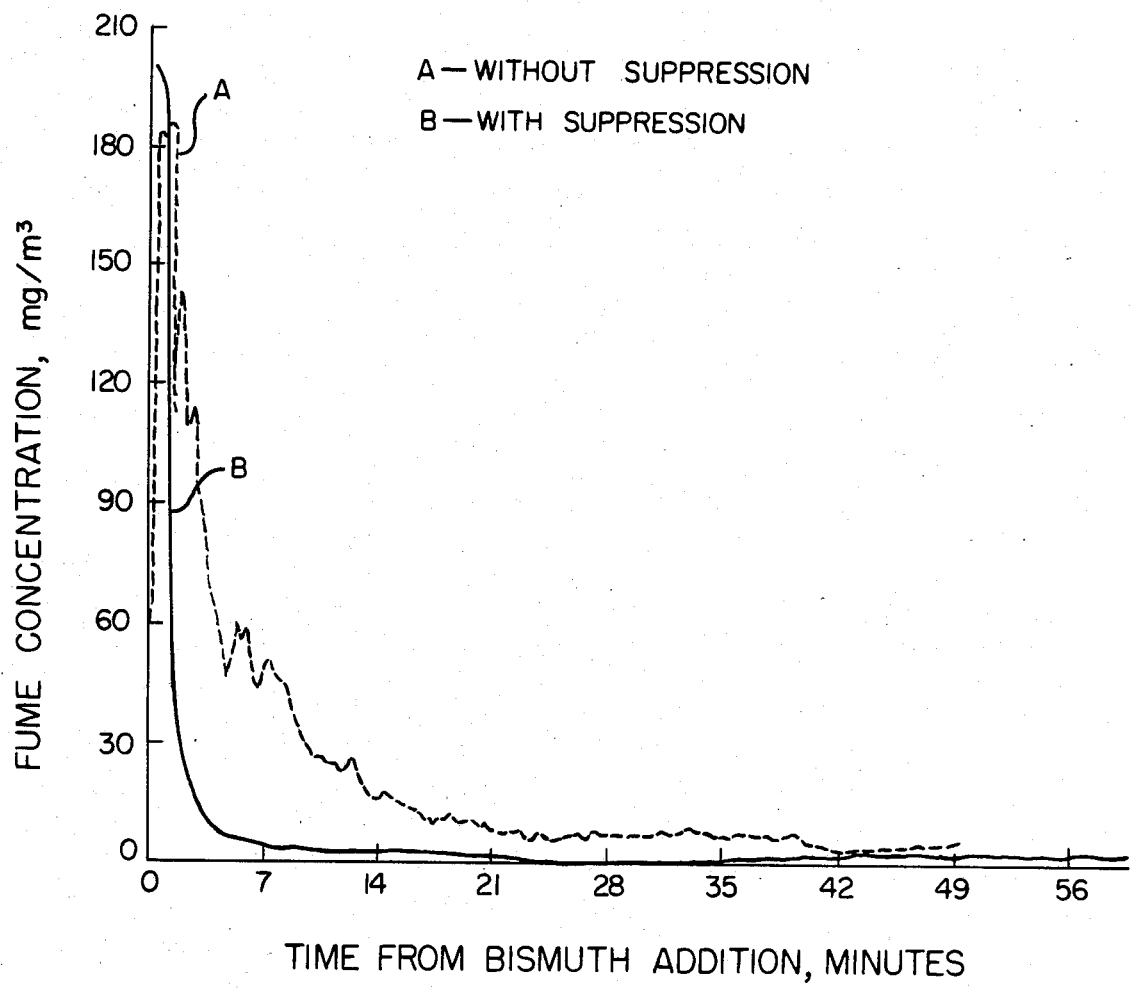

FIG. 2 contains similar data for two runs in which 0.3 wt. % bismuth was added.

As shown in the Figures, addition of the bismuth initially generates a surge of fume emissions. The fume concentration rapidly declines in the first few minutes after addition and, subsequently, the fume concentration decays at a much slower rate. When flame suppression is used to reduce the oxygen partial pressure above the melt, fume generation is dramatically reduced during both the initial surge period and the subsequent decay period. More particularly, the level of suppression is consistently higher than 90% during the initial period following bismuth addition, while after the first few minutes, the suppression levels are in the range 60–90%.

It is postulated that the curves in FIGS. 1 and 2 are composed of two separate regions; in the first region, molten bismuth, per se, and molten steel are both present while the bismuth is dissolving. Because a substantial quantity of pure molten bismuth is present then, there is a very high partial pressure due to bismuth vapor above the molten steel bath, and a high fume concentration is observed. As the bismuth dissolves, the fume concentration decreases with time to a point in time at which all the bismuth is in solution. At this point, bismuth activity is much less than during the time before the bismuth was all dissolved and, consequently, the partial pressure due to bismuth vapor above the melt is much lower and fuming is lower.

In light of the observations discussed in the preceding paragraph, it is particularly important that fume suppression be employed during the initial period while the bismuth is undergoing dissolution in the molten steel. In other words, one should reduce substantially the oxygen content in the atmosphere adjacent the top of the molten steel bath during at least the time period in which the bismuth is undergoing dissolution in the bath of molten steel. This dissolution time period terminates when a maximum dissolution of the bismuth is obtained. The step of reducing the oxygen content (i.e. the partial pressure due to oxygen) above the molten steel bath should be initiated no later than substantially the beginning of the step of adding the bismuth to the molten steel bath.

Figure 3:
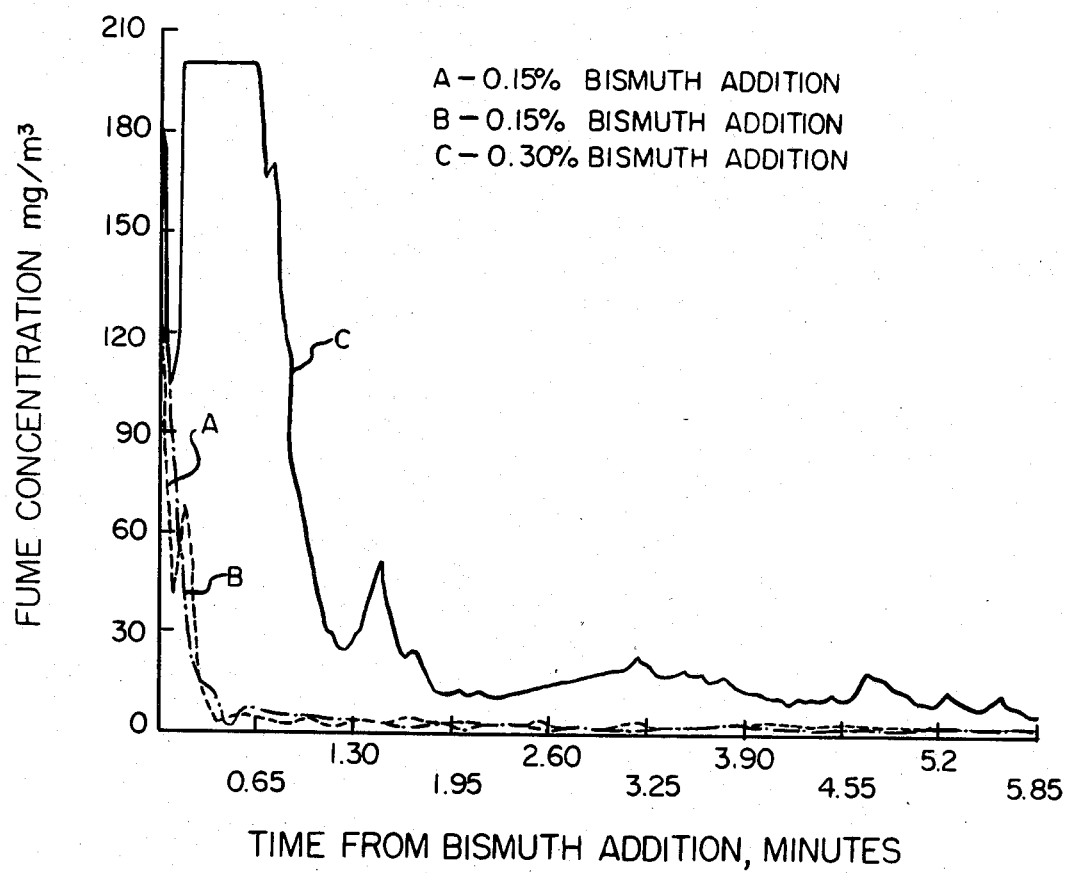
Figure 4:
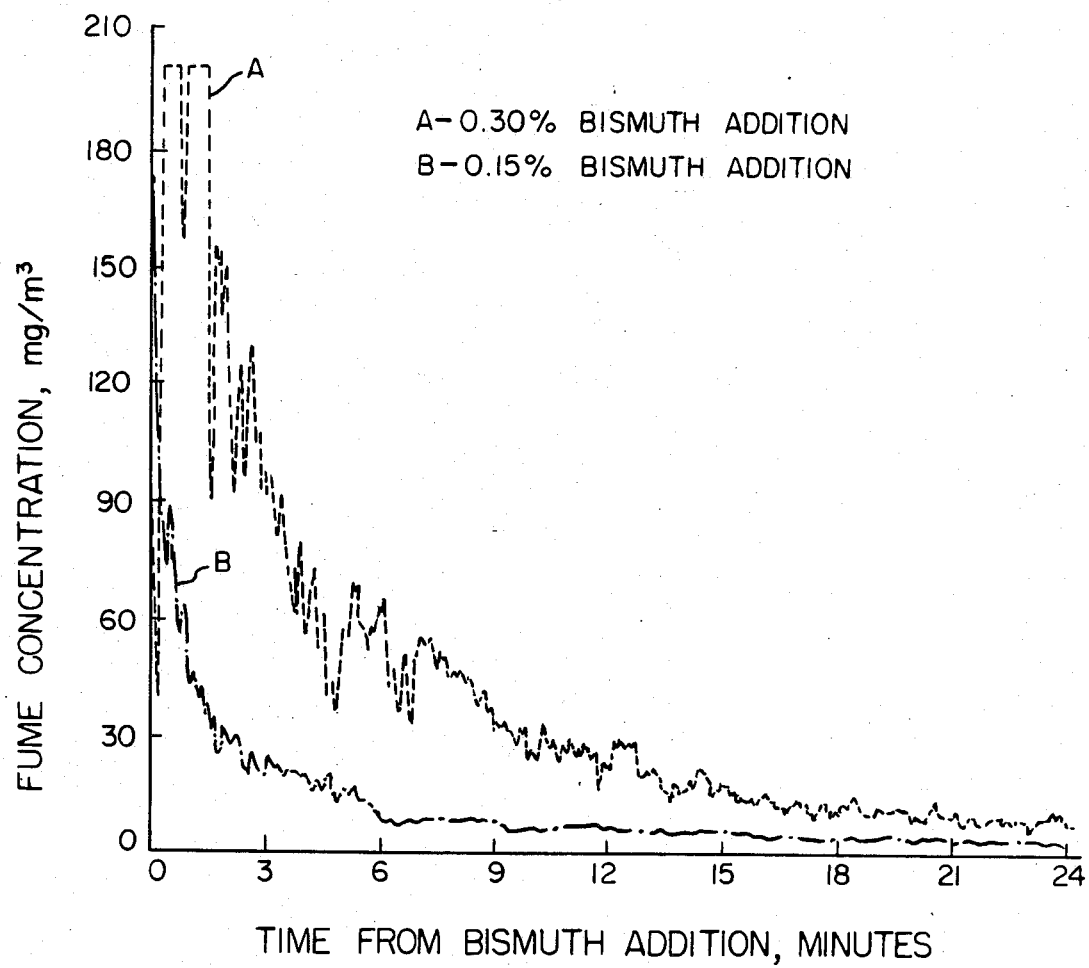

FIGS. 3 and 4 compare the extent of fuming for 0.15 wt. % and 0.3 wt. % bismuth both with suppression (FIG. 3) and without suppression (FIG. 4). A bismuth addition of 0.3 wt. % produced more fuming which persisted longer than an addition of 0.15 wt. % bismuth. The fume concentration level with suppression was also higher for the 0.3 wt. % bismuth addition than for the 0.15 wt. % bismuth addition. Thus, both the vapor pressure of the additive (partial pressure of bismuth vapor) and the amount of additive (0.3 wt. % versus 0.15 wt. % bismuth) effect the amount of fuming.

In accordance with the present invention, it has been determined that, although pure metals (e.g. pure iron or pure bismuth) fume at the same rate when in the presence of the same amount (partial pressure) of oxygen, molten steel containing bismuth as an alloying ingredient does not produce these results. Instead, the addition of bismuth to molten steel produces substantially more fuming, in the presence of the same amount (partial pressure) of oxygen, than molten steel without the bismuth addition.

From the foregoing it is postulated that the extent of fume generation from a metal solution (e.g. bismuth dissolved in molten steel) is dependent upon the vapor pressures and activities of the solute metals. Thus, in the case of a bismuth-containing steel wherein bismuth is dissolved in the molten steel, the extent of fume generation is dependent upon the vapor pressures of the iron and the bismuth and the activities thereof. Because the vapor pressure of the bismuth is so much higher than that of iron (8,000 times greater at 1600° C.) and because the fuming activity of bismuth is so much greater than that of iron, the extent of fume generation for a bismuth-containing steel is much greater than that of the same molten steel without bismuth, or of pure bismuth, in the presence of the same amount (partial pressure) of oxygen.

The compositions of the fumes generated from molten steels containing bismuth additions are set forth in Table I. The fumes are composed mostly of bismuth with lesser amounts of iron. The ratio of bismuth to iron ranges from 18 to 1 to 298 to 1 and averages 65 to 1. Microscopic analysis determined that the bismuth was present as an oxide, reflecting a forced vaporization generation mechanism. The iron in the fume could result from either forced vaporization or from carry-out on the bismuth vapor.

TABLE I

Composition of Fume Generated by Bismuth Addition

| Run Number | Bismuth Added, % | Fume Generated | | | |
|---|---|---|---|---|---|
| | | Bismuth, % | Iron, % | Bi/Fe Ratio | Soot |
| 1 | 0.30 | 3.8 | 0.1 | 38 | Heavy |
| 2 | 0.15 | 22.40 | 0.7 | 32 | Heavy |
| 3 | 0.30 | 37.2 | 2.1 | 18 | Heavy |
| 4 | 0.15 | 83.8 | 1.1 | 76 | Slight |
| 5 | 0.15 | 50.7 | 1.2 | 42 | Moderate |
| 6 | 0.15 | 52.3 | 3.6 | 15 | Moderate |
| 7 | 0.15 | 89.3 | 0.3 | 298 | Slight |
| 8 | 0.15 | 75.7 | 2.6 | 29 | Moderate |
| 9 | 0.15 | 73.1 | 0.9 | 81 | Moderate |
| 10 | 0.30 | 50.1 | 0.6 | 84 | Moderate |
| 11 | 0.30 | 37.8 | 0.6 | 63 | Heavy |
| 12 | 0.30 | 29.3 | 0.6 | 49 | Heavy |
| 13 | 0.30 | 33.1 | 1.3 | 25 | Heavy |
| | | 25 | Average | 65 | |

Bismuth and iron are not the only constituents of the fume depicted in Table I. Carbon in the form of soot was also present, ranging in amount from slight to heavy. The soot derives from the cracking of the natural gas used for fume suppression.

There is an optimum natural gas flow rate for fume suppression. This is reflected in FIG. 5 wherein fume concentration is plotted against natural gas flow rate, expressed as standard cubic meters per minute.

Figure 5:
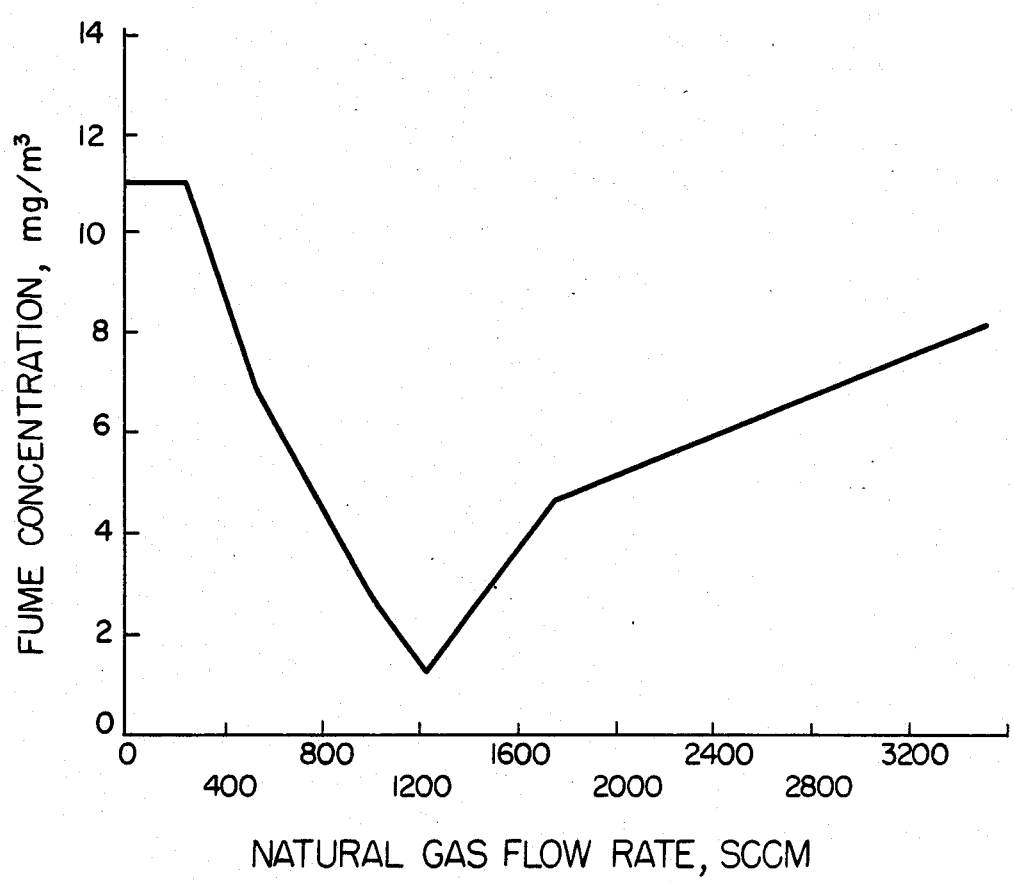
FIG. 5 is a graph plotting fume concentration versus natural gas flow rate.

FIG. 5 shows that, as the flow rate for the natural gas increases from 0, initially there is a drop in fume concentration until a minimum fume concentration is reached, and then, as the natural gas flow rate is further increased, the fume concentration increases. The natural gas flow rate at which the fume concentration is the lowest is the optimum natural gas flow rate for the particular system in which the fume suppression is being conducted. A natural gas flow rate below the optimum results in an increase in the fume generation rate. A natural gas flow rate above the optimum would cause the natural gas to crack and form soot which is undesirable and reduces the overall level of fume suppression.

Soot is produced at a flow rate above the optimum because all of the oxygen available to react with the natural gas is consumed at the optimum flow rate and because of the high temperatures existing above the molten steel bath which is at a temperature of 1600° C., for example. In the absence of sufficient oxygen to react with all the natural gas, the unreacted natural gas will crack at the high temperature to which it is subjected, forming long chain, carbonaceous materials, i.e. soot. Therefore, above the optimum flow rate, the fumes will contain soot, as well as oxidized bismuth and iron vapors; whereas below the optimum flow rate, no substantial amounts of soot are contained in the fumes.

The optimum natural gas flow rate will vary depending upon the vessel employed for containing the bath of molten steel. The optimum natural gas flow rate for a given system can be determined empirically, and such a determination should be made. Once the determination of the optimum flow rate has been made, the flow rate should be maintained at substantially that optimum rate.

The results reflected by the data in Table I and FIGS. 1-5, employing bismuth, would be generally similar for other alloying ingredients having a vapor pressure substantially greater than that of iron, such ingredients including lead, manganese and aluminum.

In a preferred embodiment of the present invention, not only is the oxygen combusted with natural gas supplied by a lance to a locale adjacent the top surface of the molten steel bath, but also, the lance employed for that purpose also comprises a ring of gas nozzles located around the outlet for the natural gas. Inert gas is introduced through these gas nozzles in the ring to the locale adjacent the top surface of the molten steel bath to form a blanket of inert gas immediately above the top surface of the bath. This prevents the oxygen which has been consumed by the natural gas in the combustion process from being replenished by air from the surrounding atmosphere which could be aspirated to a position adjacent the top surface of the molten steel bath by the action of a lance delivering natural gas alone, without inert gas. The inert gas may be nitrogen or argon, or carbon dioxide for example. The outlets for the natural gas and inert gas are positioned directly above the top surface of the molten steel bath, preferably over the center thereof (natural gas outlet) or concentric therewith (inert gas outlets).

Fume suppression techniques in accordance with the present invention may also be used to reduce bismuth fade which is a drop in the bismuth content of bismuth-containing molten steel in a ladle during a time period beginning at least as early as the start of the withdrawal of molten steel from the ladle and ending at the end of the withdrawal. Bismuth fade, during this time period, can occur as a result of forced vaporization, as described above. In such a case, bismuth fade can be prevented by using a fume suppression technique as described above.

The foregoing detailed description has been given for clearness of understanding only, and no unnecessary limitations should be understood therefrom, as modification will be obvious to those skilled in the art.

I claim:

1. A method for suppressing fuming in molten steel containing a soluble, fume-generating alloying ingredient having a vapor pressure greater than iron, said method comprising the steps of:
   providing a bath of molten steel;
   adding to said bath of molten steel a fume-generating, soluble, alloying ingredient;
   dissolving said fume-generating alloying ingredient in said bath of molten steel over a dissolution time period terminating when maximum dissolution of said alloying ingredient is obtained;
   and reducing substantially the oxygen content in the atmosphere adjacent the top of said molten bath during at least said dissolution time period, by reacting the oxygen adjacent the top of said bath with another material.

2. A method as recited in claim 1 wherein:
   said oxygen-reducing step is initiated no later than substantially the beginning of said step of adding said fume-generating ingredient.

3. A method as recited in claim 1 wherein:
   said fume-generating ingredient is at least one of the group consisting of bismuth, lead, manganese and aluminum.

4. A method as recited in claim 1 wherein:
   said fume generating ingredient is bismuth.

5. A method as recited in claim 1 wherein:
   said providing step comprises containing said bath of molten steel in a ladle or a tundish.

6. A method as recited in claim 1 wherein:
   said oxygen-reducing step comprises consuming the oxygen above said bath by combustion with natural gas;
   said method comprises determining the optimum natural gas flow rate for fume suppression for said bath;
   and said method further comprises maintaining said flow rate at substantially said optimum rate.

7. A method as recited in claim 6 wherein said step of maintaining said optimum flow rate comprises:
   maintaining the flow rate of said natural gas below that rate at which the natural gas cracks to form soot.

8. A method as recited in claim 1 wherein said step of reducing the oxygen content comprises:
   consuming the oxygen above said bath by combustion with natural gas; and
   forming a blanket of inert gas immediately above the top surface of said bath.

9. A method as recited in claim 1 wherein said step of reducing the oxygen content comprises:
   reducing the partial pressure of oxygen to a level substantially below the partial pressure of oxygen at which fuming is suppressed in molten steel without said fume-generating alloying ingredient.

10. In a process wherein bismuth is added to molten steel in a ladle and the bismuth-containing molten steel is withdrawn from said ladle over a prolonged period of time, the improvement comprising a method for preventing bismuth fade due to forced vaporization during said withdrawal period, said method comprising the steps of:

reducing substantially the oxygen content in the atmosphere adjacent the top of said molten bath during at least a major part of said withdrawal period, by consuming the oxygen adjacent the top of said bath with another gas.

11. The improvement as recited in 10 wherein said step of reducing the oxygen content comprises:

reducing the partial pressure of oxygen to a level substantially below the partial pressure of oxygen at which fuming is substantially suppressed in molten steel without said bismuth.

12. The improvement as recited in claim 10 wherein:
said oxygen-reducing step comprises consuming the oxygen above said bath by combustion with natural gas;
said method comprises determining the optimum natural gas flow rate for fume suppression for said bath;
and said method further comprises maintaining said flow rate at substantially said optimum rate.

13. The improvement as recited in claim 10 wherein said step of reducing the oxygen content comprises:

consuming the oxygen above said bath by combustion with natural gas; and
forming a blanket of inert gas immediately above the top surface of said bath.

* * * * *